US008954345B2

(12) United States Patent
Foster et al.

(10) Patent No.: US 8,954,345 B2
(45) Date of Patent: Feb. 10, 2015

(54) METHOD AND SYSTEM FOR ADVERTISING USING A MOBILE COMMUNICATION DEVICE

(75) Inventors: David Bazil Foster, Laval (CA); Brandon Reti, Montreal (CA); Sebastien Pelletier, Montreal (CA); Jorge Ivan Manzanilla, Beaconsville (CA); Alain Lefebvre, Pointe-Claire (CA); Chant Boghosjikian, Laval (CA)

(73) Assignee: Manwin Licensing International SARL, Luxembourg (LU)

( * ) Notice: Subject to any disclaimer, the term of this patent is extended or adjusted under 35 U.S.C. 154(b) by 139 days.

(21) Appl. No.: 13/588,234

(22) Filed: Aug. 17, 2012

(65) Prior Publication Data
US 2013/0254037 A1 Sep. 26, 2013

Related U.S. Application Data

(60) Provisional application No. 61/613,266, filed on Mar. 20, 2012.

(51) Int. Cl.
*G06Q 30/00* (2012.01)
*G06Q 30/02* (2012.01)
(52) U.S. Cl.
CPC ........ *G06Q 30/0267* (2013.01); *G06Q 30/0251* (2013.01); *G06Q 30/0276* (2013.01)
USPC .................. 705/14.64; 705/14.72; 705/14.49
(58) Field of Classification Search
CPC ................................................. G06Q 30/0267
USPC .......................................................... 705/14.64
See application file for complete search history.

(56) References Cited

U.S. PATENT DOCUMENTS

| | | | |
|---|---|---|---|
| 6,757,661 B1 * | 6/2004 | Blaser et al. | 705/14.54 |
| 2003/0101242 A1 * | 5/2003 | Cowden et al. | 709/220 |
| 2008/0258913 A1 * | 10/2008 | Busey | 340/540 |
| 2010/0042501 A1 * | 2/2010 | Lee | 705/14.53 |
| 2010/0100842 A1 | 4/2010 | Kim | |
| 2011/0258050 A1 | 10/2011 | Chan et al. | |
| 2012/0016752 A1 | 1/2012 | Crim | |

OTHER PUBLICATIONS

"Open Multiple Pages Using a Single Link" (AHMEDZAI) Sep. 25, 2011 "http://www.mybloggertricks.com/2011/09open-multiple-webpages-using-single.html".

* cited by examiner

*Primary Examiner* — John G Weiss
*Assistant Examiner* — Scott C Anderson
(74) *Attorney, Agent, or Firm* — Welsh Flaxman & Gutter LLC

(57) ABSTRACT

A method for providing advertisements on mobile communication devices includes identifying at least one URL link to which it is desired to add an advertising functionality and adding the advertising functionality to the at least one URL link. Upon the addition of the advertising functionality to the at least one URL link, selection of the at least one URL link results in opening both a primary first web page directly associated with the at least one URL link clicked by the user and a secondary second web page.

20 Claims, 5 Drawing Sheets

METHOD AND SYSTEM FOR ADVERTISING USING A MOBILE COMMUNICATION DEVICE

CROSS REFERENCE TO RELATED APPLICATIONS

This application claims the benefit of U.S. Provisional Patent Application Ser. No. 61/613,266 filed Mar. 20, 2012, entitled, "POP-UNDER INTERNET PAGE."

BACKGROUND OF THE INVENTION

1. Field of the Invention

The invention relates to a method and system for opening a secondary web page on a mobile communication device.

2. Description of the Related Art

Internet pop-ups have long been used to increase advertisement opportunities on Internet browsers used with personal computers. As those skilled in the art appreciate a pop-up is a graphical user interface display area, usually a small window, that suddenly appears ("pops-up") in the foreground of the visual interface.

With the advent of smart phones and other mobile communication devices, for example, tablets, the technique of delivering advertisements via pop-ups was hampered by the fact that smart phones do not use multiple separate windows for displaying the Internet content. In particular, while the provision of a secondary window as discussed above is easily accomplished on desktop browsers, the limited size of the screens employed by mobile communication devices, in conjunction with default programming for opening a new browser tab each time a new web page is accessed, makes it difficult to utilize secondary windows for advertising purposes due to the built in provision that forces mobile communication devices to always switch their focus to any newly opened page. As a result, it impossible to "pop open" a new tab and place it in the background (behind, or under), in a conventional way.

Instead, Internet browsers for smart phones use a single window with individual tabs for each new internet page. The present invention solves this problem.

SUMMARY OF THE INVENTION

It is, therefore, an object of the present invention to provide a method for providing advertisements on mobile communication devices includes identifying at least one URL link to which it is desired to add an advertising functionality and adding the advertising functionality to the at least one URL link. Upon the addition of the advertising functionality to the at least one URL link, selection of the at least one URL link results in opening both a primary first web page directly associated with the at least one URL link clicked by the user and a secondary second web page.

Other objects and advantages of the present invention will become apparent from the following detailed description when viewed in conjunction with the accompanying drawings, which set forth certain embodiments of the invention.

DESCRIPTION OF THE PREFERRED EMBODIMENT

Figure 1:
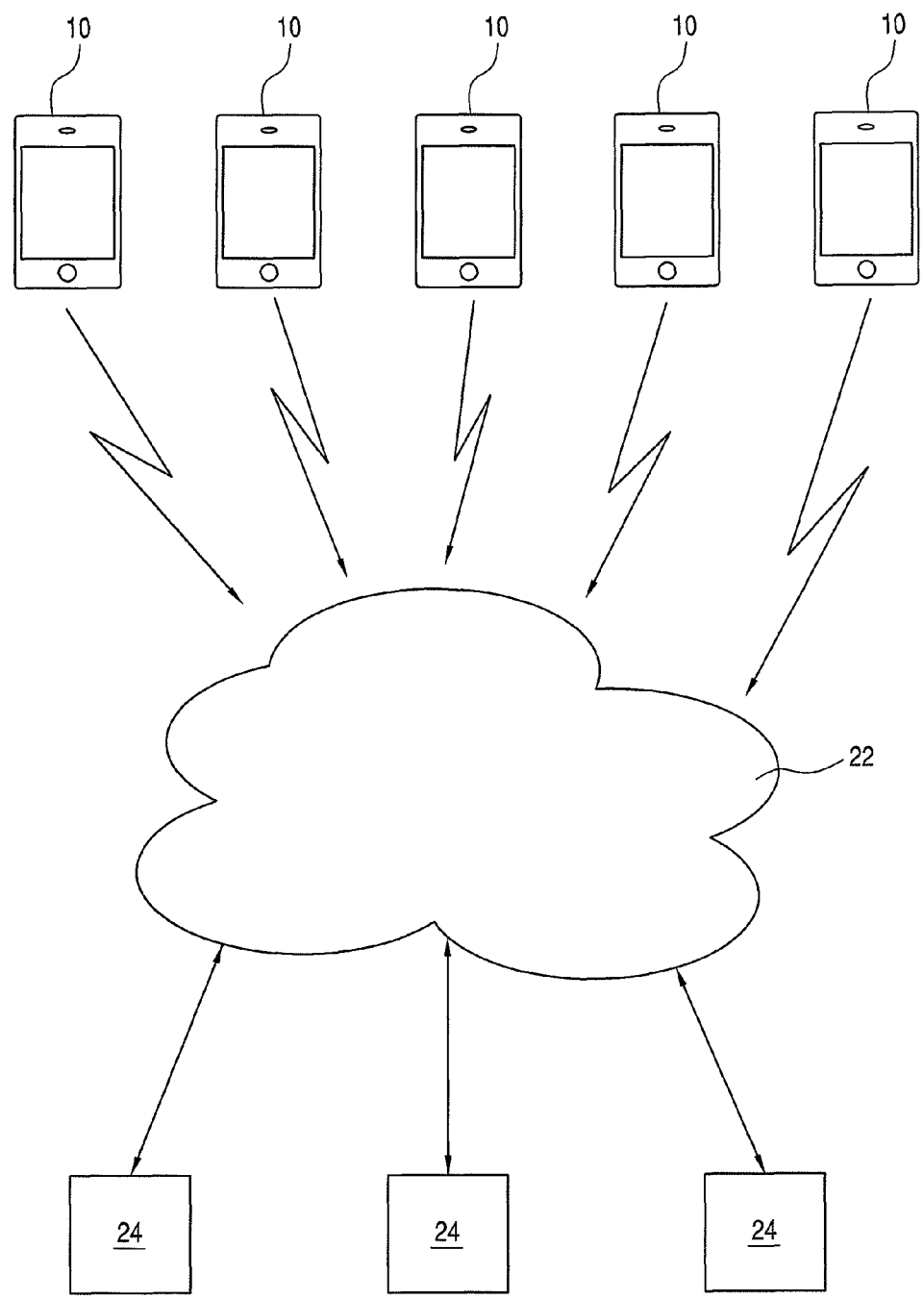
FIG. 1 is a schematic of the present system for advertising using a mobile communication device.

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make and/or use the invention.

Referring to FIGS. 1 through 5, a system and method for providing advertisements on mobile communication devices 10, for example, smart phones, is disclosed. In particular, and as will be appreciated based upon the following disclosure, the present invention provides functionality for opening a secondary second web page and positioning it outside the mobile user's immediate focus. This functionality provides for the subtle insertion of an advertisement from a sponsor outside the currently viewable area so that the user sees it at a later time, most likely after he closes the browser tab within which he/she is currently browsing a prior website.

More particularly, and as will be explained below in detail, the method provides advertisements on mobile communication devices 10, wherein each of the mobile communication devices 10 includes a microprocessor 12, a user input mechanism 16, means for mobile access 18 to a communication network and a graphical user interface 14 upon which is displayed a mobile web browser 20 under the control of the microprocessor 12. The mobile web browser 20 supports multiple browser tabs 26, 28. The method broadly includes identifying specific URL links to which it is desired to add an advertising functionality and adding the advertising functionality to, for example, the URL link 40. Upon the addition of the advertising functionality to the URL link 40, selection of the URL link 40 results in opening both a visible primary first web page 30 directly associated with the URL link 40 clicked by the user and a hidden secondary second web page 32.

From the point of view of one implementing the present methodology, the operator first identifies URL links to which it is desired to add an advertising functionality, the URL link being associated with source content of a primary first web page 30. The advertising functionality is added to the URL link to create a modified URL link 40, wherein upon the addition of the advertising functionality to the URL link, selection of the modified URL link results in opening both a visible primary first web page 30 directly associated with the URL link 40 clicked by the user and a hidden secondary second web page 32. A request is received from a user of the mobile communication device 10 for source content containing the modified URL link and the source content is transmitted to the user for viewing in a first browser tab 26 of the mobile web browser 20. Thereafter a request from the user of the mobile communication device 10 for the source content associated with the modified URL link is received and a second browser tab 28 is opened on the graphical user interface 14 of the mobile communication device 10. The primary first web page 30 directly associated with the URL link 40 is transmitted for viewing in the second browser tab 28, and the secondary second web page 32 is transmitted for viewing in the first browser tab 26 which is positioned hidden from view by the user of the mobile communication device 10.

With the foregoing in mind, the present methodology is implemented using a mobile communication device 10 that includes a microprocessor 12, a user input mechanism 16, a mechanism for mobile access to a communication network, and a graphical user interface 14 upon which is displayed a mobile web browser 20 under the control of the microprocessor 12, wherein the mobile web browser 20 supports multiple browser tabs. A URL link 40 viewed upon the graphical user interface 14 is further provided. The URL link 40 is modified with advertising functionality that prevents default functionality of the mobile communication device 10 regarding opening URL links 40 and instead opens a visible primary first web page 30 associated with the URL link 40 in a new browser tab and opens the hidden secondary second web page 32 in the first browser tab 26.

Using the Internet programming language known as JavaScript the normal functionality of an URL link is modified so that clicking upon a single URL link 40 results in opening both a visible primary first web page 30 directly associated with the URL link 40 clicked by the user and a hidden secondary second web page 32. The secondary second web page 32 is opened in such a way that it is opened outside of the focus of the user of the mobile communication device 10. The secondary second web page 32 thus ends up being "behind", or "underneath", the primary first web page 30 the user is currently viewing.

For example, before the URL link is modified in accordance with the present invention, clicking upon the URL link in a first browser tab of a web browser of the mobile communication device opens only the primary first web page 30 m.videobash.com in the first browser tab 26. After the URL link is modified in accordance with the present invention, clicking upon the modified URL link 40 in a first browser tab 26 of the mobile web browser 20 of the mobile communication device 10 results in opening the primary first web page 30 m.videobash.com in a new (or second) browser tab 28 of the mobile web browser 20 of the mobile communication device 10 as well as a hidden second web page 32 m.collegehumor.com in the first (or original) browser tab 26 of the mobile web browser 20 of the mobile communication device 10 in which the modified URL link 40 previously existed, with the second browser tab 28 being positioned over the original browser tab. In this way, the primary first web page 30 m.videobash.com is opened "over" the secondary second web page 32 m.collegehumor.com. The opening of the second web page 32 is indiscernible to the extent that the user clearly sees that the first web page 30 of the URL link 40 he/she just clicked is being opened in a new browser tab (that is, the second browser tab 28). The user is then sent to the second browser tab 28 where he or she views the first web page 30 and does not see the content of the first browser tab 26 which is being populated with the sponsor advertisement (for example, m.collegehumor.com) until he visits it later or closes the currently viewed second browser tab 28 which consequently brings focus to the advertisement browser tab.

Figure 2:
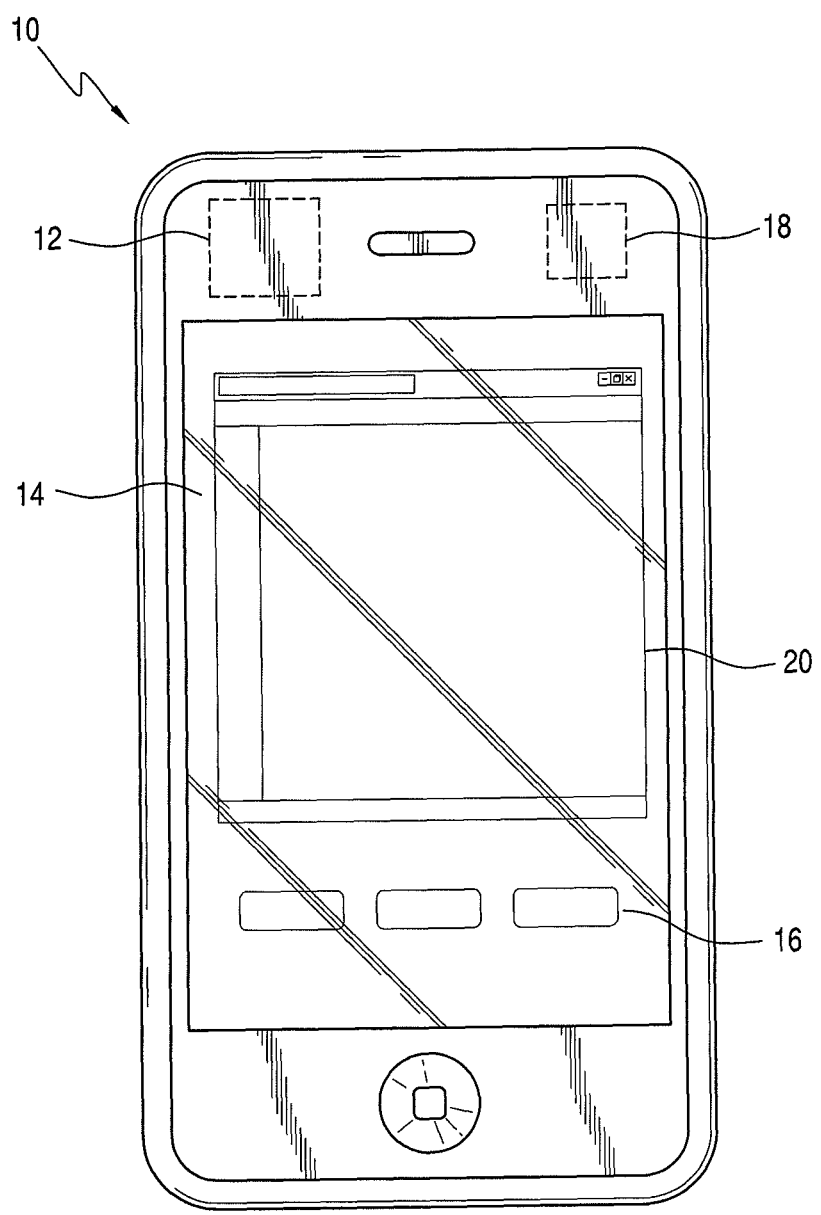
FIG. 2 is a top view of a mobile communication device used in conjunction with the present invention.
Figure 3:
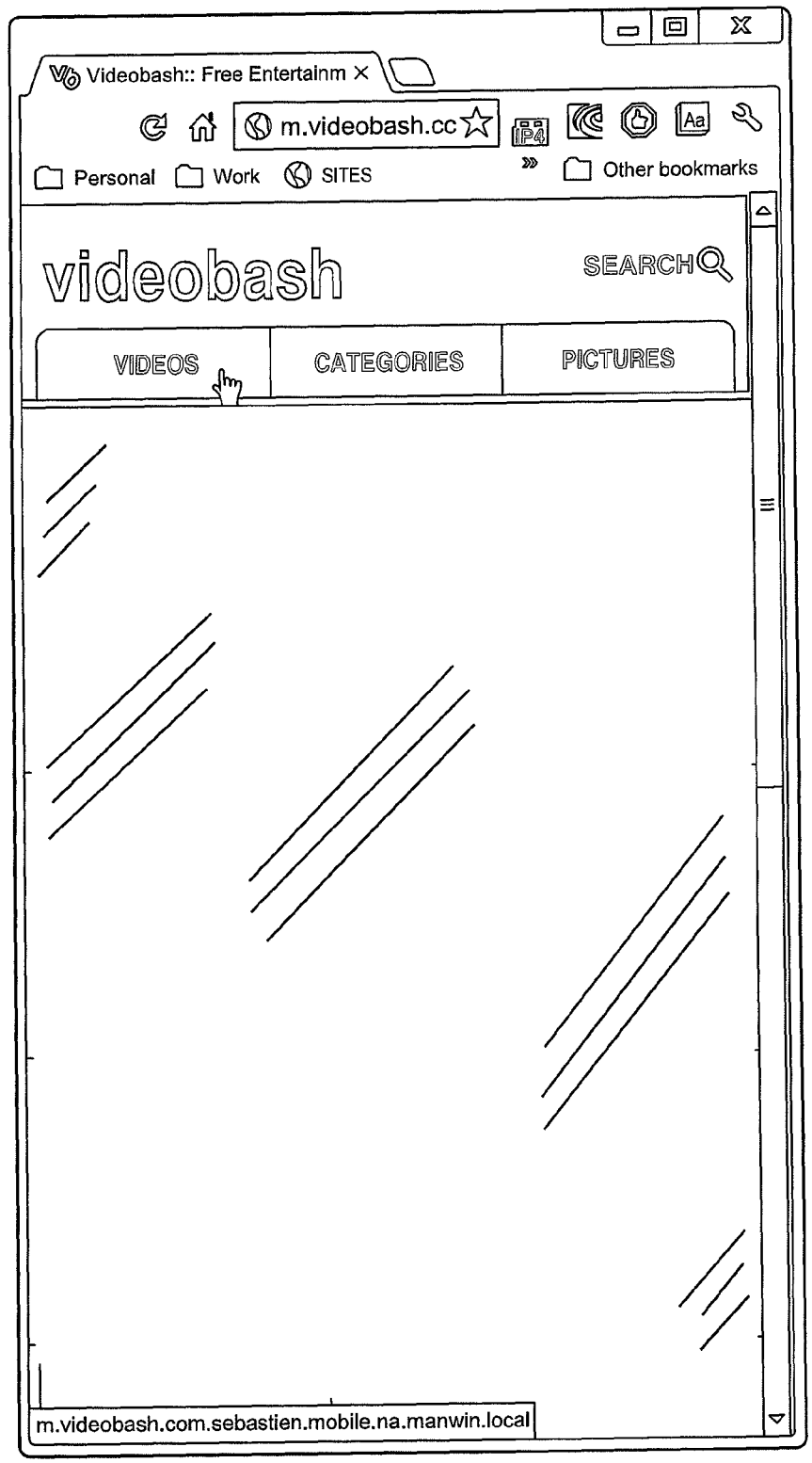
FIG. 3 shows a mobile web browser before the user clicks on a URL link that has the pop-under advertising functionality in accordance with the present invention.
Figure 4:
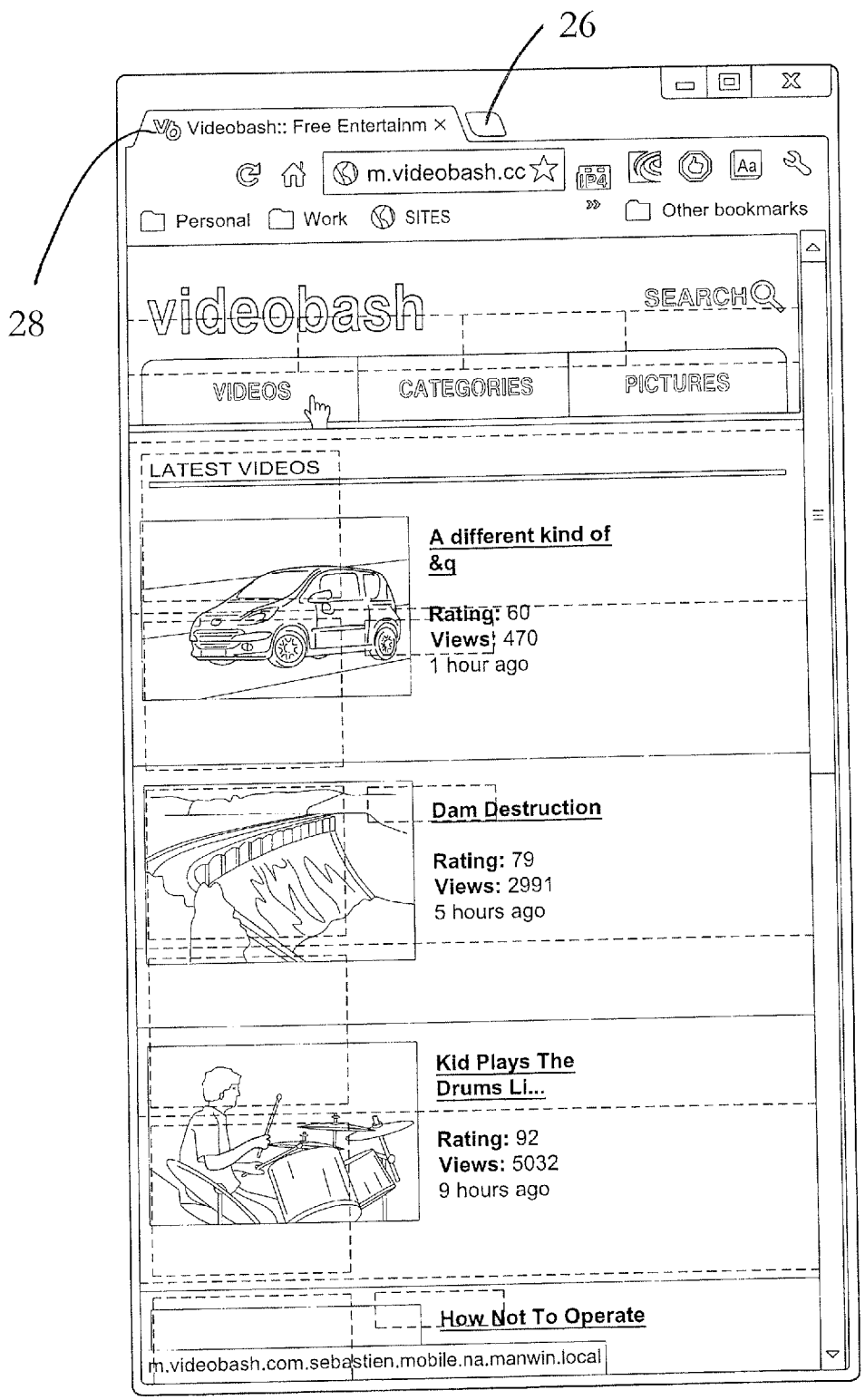
FIG. 4 shows the mobile web browser immediately following the click, as one can see the focus has now switched over to the new (or second) browser tab which contains the primary web page associated with the URL link (as shown with reference to the objects shown in solid lines). The original (or first) browser tab has now been populated by the "pop-under", secondary web page presenting advertising (as shown with reference to the objects shown in broken lines), which is now not visible to the user of the mobile communication device as it is positioned under the new browser tab.
Figure 5:
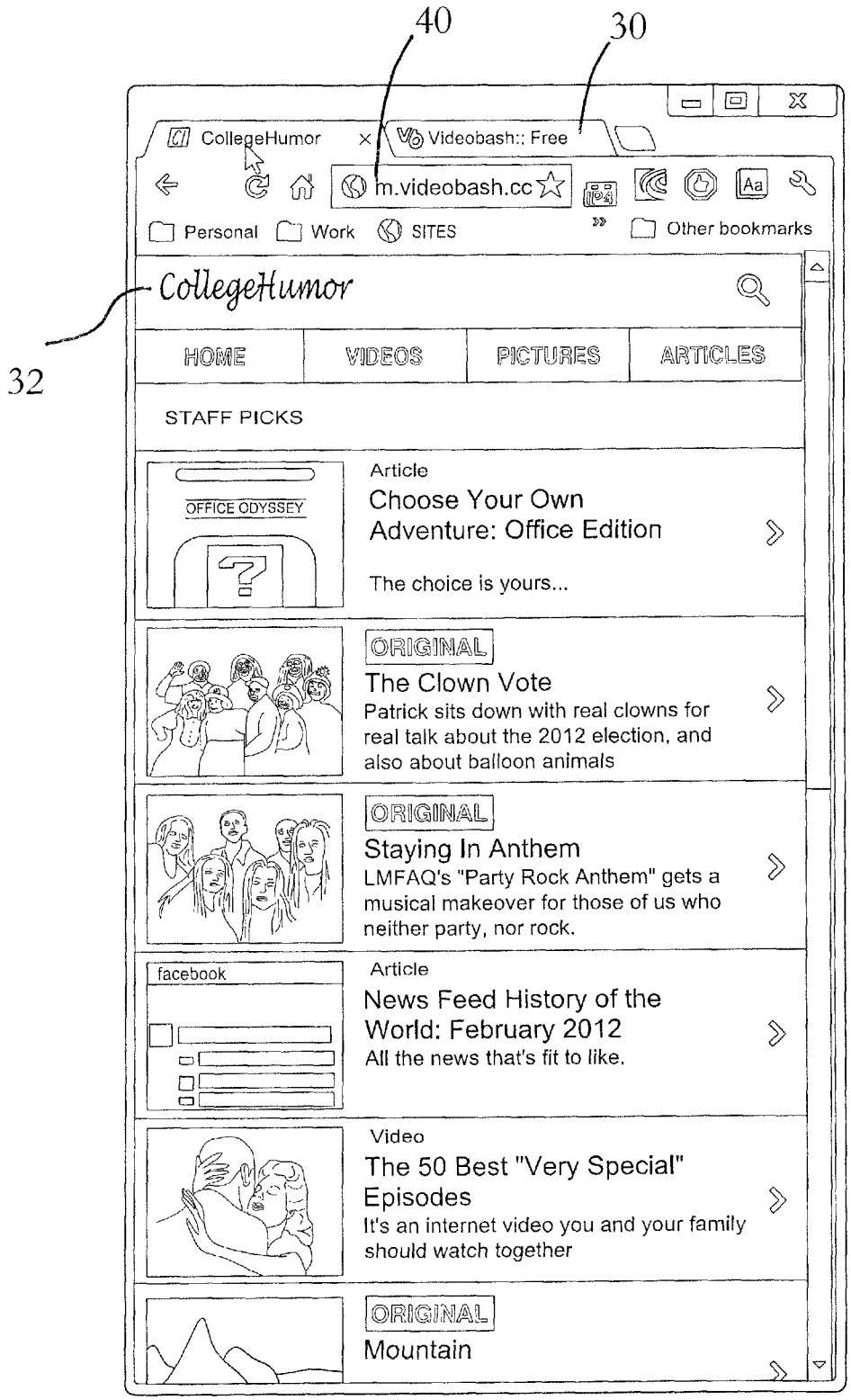
FIG. 5 shows the original (first) browser tab on which the sponsor's advertisement (that is, the secondary web page) is displayed.

Referring now to FIG. 2, the present system and method are designed for use in conjunction with mobile communication devices 10. As those skilled in the art will certainly appreciate, mobile communication device 10, for example, iPhone, iPad, Google Android phones, and Windows phones, provide users with a handheld computer offering great versatility. These mobile communications devices 10 all include similar basic components. For example, each includes a microprocessor 12 and graphical user interface 14 upon which is displayed content processed and displayed for the user. Each mobile communication device 10 also includes a user input mechanism 16, for example, a QWERTY keyboard, roller ball, and/or a touch screen, and a means for mobile access 18 to a communication network such as the Internet 22. The means for mobile access 18 can include Wi-Fi, cellular networks, or other wireless data transmission mechanisms known those skilled in the art. Each of these mobile communication device 10 includes a mobile web browser 20 selective displayed upon the graphical user interface 14 under the control of the microprocessor 12. The browser 20 displays content accessed from various content sources 24 via the Internet 22 using the means for mobile access 18.

As discussed above, the mobile communication device 10 uses a mobile web browser 20 to access the Internet 22. As those skilled in the art appreciate, web browsers are built with the ability to open multiple documents, web pages, etc. within in single window. This is referred to as a tabbed document interface and is commonly employed in conjunction with both browsers for mobile communication devices 10 and browsers for standard laptop and desktop computers. Using a tabbed browser interface, the clicked upon URL links can open inside the same browser tab of the web browser or the clicked upon URL link can open in a new browser tab, regardless of whether they are internal or external links. It is appreciated that internal URL links are those URL links from the same source as the original URL source, while external URL links are those URL links from a source different from the original URL source. The destination of a URL link (new browser tab vs current browser tab) is determined by the HTML markup code "target". It is the decision of the developer whether to open URL links inside the current browser tab or to open the URL links inside of a new browser tab. In the practice of the present invention, it doesn't matter whether the URL link is an internal URL link or an external URL link, the Javascript code works the same way regardless of the origin of the URL links used. This default programming is believed to offer improved user functionality by allowing users to keep open various web pages as they use their mobile communication device 10 to access the Internet.

In particular, the browser tabs 26, 28 of the mobile web browser 20 allow multiple URL links to be contained within a single window, using the browser tabs as a navigational widget for switching between sets of URL links. The browser tabs are often modeled after traditional card tabs inserted in paper files or card indexes or may be accessed using a separate screen accessible via the graphical user interface 14 of the mobile communication device 10. As such, when a user of a mobile communication device 10 clicks upon a URL link, which has been coded to open in a new browser tab, within a first browser tab 26, the mobile web browser 20 will open a secondary browser tab over the primary browser tab.

In accordance with a preferred embodiment of the present invention, the opening of a second web page 32 outside of the view of the user of the mobile communication device 10, in particular, in a primary first browser tab 26 positioned behind a secondary second browser tab 28, is achieved in the following manner:

Using JavaScript, the operator of the present system "crawl" the HTML data of a selected web page to identify specific URL links to which we want to add the advertising functionality provided in accordance with the present invention. In accordance with a preferred embodiment, the functionality of the present invention is attached onto specific URL links 40 using JavaScript out of convenience and practicality. It is appreciated, the functionality of the present invention, could be hardcoded to each of the URL links of interest. In accordance with a preferred embodiment, the JavaScript parses the source code of the web page and attaches a listener, that is, a piece of coding instructing the mobile communication device 10 to act in accordance with the present invention, onto URL links that match specific IDs and/or CSS (Cascading Style Sheet) classes. These IDs and CSS classes may differ from one site to the next. Their only purpose is to allow the parser function to identify them as links we want to attach a listener to. In accordance with a preferred embodiment, the listener is a JavaScript onclick listener which activates the code attached to the URL link once a user clicks thereupon. As those skilled in the art will certainly appreciate, JavaScript, a trademark of Oracle Corporation, is a prototype-based scripting language supporting object-oriented, imperative and functional programming styles.

For every URL link for which modification in accordance with the present invention is desired, using JavaScript, the URL link is modified with an onclick listener in a manner preventing the default functionality of the mobile communication device 10. The default functionality would be to open the link in a conventional manner when the user clicks on the URL link 40, and instead a special function is run. As mentioned above, and in accordance with a preferred embodiment, an onclick listener is attached to specific URL links 40 on the web page of interest. When a user clicks on the URL link 40, a function in accordance with the present invention is called which first determines whether the user qualifies to have the functionality of the present invention, that is, the pop-under action, occur. If yes, then using a JavaScript command, the mobile web browser 20 is asked to cancel/prevent the default action (which would be to open the URL link in a normal way) and instead the mobile web browser 20 opens the expected URL link in a new browser tab and has the current browser tab hidden and directed to the advertisement internal address.

In particular, and once the URL link has been modified in accordance with the present invention, upon clicking upon the URL link 40 upon the browser of the mobile communication device 10, the microprocessor 12, under the control of which the browser is operating, first establishes whether the user has been previously presented with the advertisement joined to the URL link 40 the system in a pre-determined period of time, such as the last 24 hours. In accordance with a preferred embodiment, the present system uses technology that is built into smart phones of today, namely Local Storage is used which allows for the determination as to whether a specific device has already been presented with the pop-under within a 24 hour period. This is assuming that the user does not manually empty/clear/reset his Local Storage, in which case the devices would have no means of knowing whether this was a returning or new visitor. The pop-under is not enabled on phones that do not support Local Storage.

If the microprocessor 12 determines that the user has never seen the advertisement associated with the URL link 40, or hasn't seen the advertisement associated with the URL link 40 in the pre-determined period of time, then the function proceeds to opening both the first URL link's original destination (that is, the primary first web page 30) as well as a secondary, pre-determined URL link that opens the second web page 32 of an advertisement partner.

Using JavaScript, the original destination (that is, the primary first web page 30) is opened in a new browser tab 28 on the mobile web browser 20, while the existing tab does a redirection to the secondary URL link and opens the second web page 32 in the original browser tab 26. As a result of this, and due to the mobile default functionality of transferring the focus to whatever new browser tab browser is opened, the second web page 32 ends up behind the primary $1^{st}$ web page 30 and is hidden from the user until the user closes the current browser tab. This is how the present invention is able to "pop" a new page and position it "under" the intended original destination of the clicked URL link.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A method for providing advertisements on a mobile communication device, the method comprising the steps of;
   identifying at least one uniform resource locator link to which it is desired to add an advertising functionality on the mobile communication device, wherein the mobile communication device includes a microprocessor, a user input mechanism, mobile access to a communication network selected from Wi-Fi, cellular networks, or other wireless data transmission mechanisms and a graphical user interface upon which is displayed a mobile web browser under control of the microprocessor, and wherein the mobile web browser supports multiple browser tabs;
   adding the advertising functionality to the at least one uniform resource locator link that prevents default functionality of the mobile communication device regarding opening of the at least one uniform resource locator link;
   wherein upon the addition of the advertising functionality to the at least one uniform resource locator link, selection of the at least one uniform resource locator link results in the microprocessor of the mobile communication device controlling and opening both a primary first web page directly associated with the at least one uniform resource locator link clicked by the user in a second browser tab and a secondary second web page and positioning the secondary second web page in a first browser tab under a display of the primary first web page in the second browser tab and outside an immediate focus of a mobile user.

2. The method according to claim 1, wherein adding the advertising functionality includes parsing source code of a web page and attaching a piece of coding instructing the mobile communication device to act by opening both the primary first web page directly associated with the uniform resource locator link clicked by the user and the secondary second web page.

3. The method according to claim 2, wherein the piece of coding is an online listener.

4. The method according to claim 1, wherein the mobile communication device is a smartphone.

5. The method according to claim 1, wherein the advertising functionality associated with at least one uniform resource locator link prevents default functionality of the mobile communication device regarding opening at least one uniform resource locator link.

6. The method according to claim 5, wherein the advertising functionality determines whether the user of the mobile communication device has been previously presented with the secondary second web page.

7. The method according to claim 6, wherein, if the advertising functionality determines the user of the mobile communication device has not been previously presented with the secondary second web page, the special function opens the primary first web page associated with the at least one uniform resource locator link in a second browser tab and opens the secondary second web page in a first browser tab hidden from view of the user of the mobile communication device.

8. A method for providing advertisements on a mobile communication device, the mobile communication device includes a microprocessor, a user input mechanism, mobile access to a communication network and a graphical user interface upon which is displayed a mobile web browser under the control of the microprocessor, wherein the mobile web browser supports multiple browser tabs, the method comprising the steps of;
   identifying at least one uniform resource locator link to which it is desired to add an advertising functionality, the at least one uniform resource locator link being associated with source content of a primary first web page that prevents default functionality of the mobile communication device regarding opening of the at least one uniform resource locator link;
   adding the advertising functionality to the at least one uniform resource locator link to create at least one modified uniform resource locator link, wherein upon the addition of the advertising functionality to the at least one uniform resource locator link, selection of the at least one modified uniform resource locator link results in opening both a primary first web page directly associated with the at least one uniform resource locator link clicked by the user and a secondary second web page;
   receiving from a user of the mobile communication device a request for source content containing the at least one modified uniform resource locator link;
   transmitting to the user the source content for viewing in a first browser tab of the mobile web browser;
   receiving from the user of the mobile communication device a request for the source content associated with the at least one modified uniform resource locator link;
   opening a second browser tab and transmitting a primary first web page directly associated with the at least one uniform resource locator link for viewing in the second browser tab;
   transmitting a secondary second web page for viewing in the first browser tab which is positioned hidden from view by the user of the mobile communication device; and
   viewing the primary first web page in the second browser tab and viewing the secondary second web page in the first browser tab upon closure of the second browser tab.

9. The method according to claim 8, wherein adding the advertising functionality includes parsing source code of a web page and attaching a piece of coding instructing the mobile communication device to act by opening both the primary first web page directly associated with the uniform resource locator link clicked by the user and the secondary second web page.

10. The method according to claim 9, wherein the piece of coding is an online listener.

11. The method according to claim 8, wherein the mobile communication device is a smartphone.

12. The method according to claim 8, wherein the advertising functionality associated with the at least one uniform resource locator link prevents default functionality of the mobile communication device regarding opening at least one uniform resource locator link.

13. The method according to claim 12, wherein the advertising functionality determines whether the user of the mobile communication device has been previously presented with the secondary second web page.

14. The method according to claim 13, wherein, if the advertising functionality determines the user of the mobile communication device has not been previously presented with the secondary second web page, the special function opens the primary first web page associated with the uniform resource locator link in a second browser tab and opens the secondary second web page in a first browser tab hidden from view of the user of the mobile communication device.

15. A mobile communication device, comprising:
   a microprocessor,
   a user input mechanism,
   mobile access to a communication network selected from Wi-Fi, cellular networks, or other wireless data transmission mechanisms, and
      a graphical user interface upon which is displayed on a mobile web browser under the control of the microprocessor, wherein the mobile web browser supports multiple browser tabs;
      a uniform resource locator link viewed upon the graphical user interface, the uniform resource locator being modified with advertising functionality that prevents default functionality of the mobile communication device regarding opening the uniform resource locator link and instead the microprocessor of the mobile communication device opens a primary first web page associated with the uniform resource locator link in a new browser tab and opens the secondary second web page in the first browser tab and positioning the first browser tab under a display of the primary first web page and outside immediate focus of a mobile user.

16. The mobile communication device according to claim 15, wherein the advertising functionality is a piece of coding instructing the mobile communication device to act by opening both the primary first web page directly associated with the uniform resource locator link clicked by the user and the secondary second web page.

17. The mobile communication device according to claim 16, wherein the piece of coding is an online listener.

18. The mobile communication device according to claim 15, wherein the mobile communication device is a smartphone.

19. The mobile communication device according to claim 15, wherein the advertising functionality determines whether the user of the mobile communication device has been previously presented with the secondary second web page.

20. The mobile communication device according to claim 19, wherein, if the advertising functionality determines the user of the mobile communication device has not been previously presented with the secondary second web page, and opens the primary first web page associated with the uniform resource locator link in a second browser tab and opens the secondary second web page in a first browser tab hidden from view of the user of the mobile communication device.

* * * * *